United States Patent Office

2,906,752
Patented Sept. 29, 1959

2,906,752

NEW CHEMICAL COMPOUND, 1-(4-CHLOROPHENYL)-3-(5-NITRO-2-FURYL)-2-PROPEN-1-ONE

John C. Howard, Norwich, N.Y., assignor to The Norwich Pharmacal Company, Norwich, N.Y., a corporation of New York No Drawing. Application September 24, 1958
Serial No. 762,946

1 Claim. (Cl. 260—240)

This invention relates to the new chemical compound, 1-(4-chlorophenyl)-3-(5-nitro - 2 - furyl) - 2 - propen - 1-one, represented by the formula:

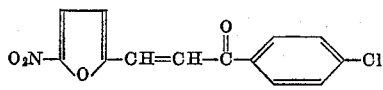

I have discovered that this new compound is distinguished by the high order of chemotherapeutic activity which it exhibits in combatting helminthic infections in animals when administered in far less than toxic amounts.

This new compound has proved surprisingly successful upon oral administration in the treatment of animals heavily infected with *Syphacia obvelata*. That parasite is the causative agent of pinworm infection in mice. It is representative of the variety of pinworm organisms including *Enterobius vermicularis* which is provocative of helminthic infection in human beings and whose sensitivity to oxyuracidal agents is substantially the same as that of *Syphacia obvelata*. Human beings infected with *Enterobius vermicularis* should be treated immediately with an effective therapeutic agent for failure to do so may result in convulsions in children and may lead to acute appendicitis in both children and adults. Another outcome pursuant to failure to effect early treatment and cure is the exposure to the infection of others with whom the infected carrier may come in contact thereby causing transmission of the disease. Auto-infection of this disease is quite common.

My new compound is effective when administered orally to mice heavily infected with *Syphacia obvelata* as shown by the results set forth in the following table:

lactic as well as curative treatment is readily achieved thereby.

My new compound may be readily obtained by nitrating 1-(4-chlorophenyl)-3-(2-furyl) - 2 - propen - 1-one under suitable conditions to yield 1-(4-chlorophenyl) - 3 - (5 - nitro - 2 - furyl) - 2 - propen - 1-one. The condition which I now prefer involves the use of diacetylorthonitric acid as the nitrating agent. As a reaction medium I prefer acetic anhydride. I have also found that the reaction may be promoted by the use of a catalyst such as a strong mineral acid, sulfuric acid serving well.

Other nitrating agents such as a mixture of nitric acid and acetic anhydride may be employed; and other diluents such as propionic or butyric anhydride may be employed as the reaction medium.

According to the process that I now prefer, 1-(4-chlorophenyl) - 3 - (2 - furyl) - 2 - propen - 1 - one, dissolved in acetic anhydride, is added to a nitrating medium comprising diacetylorthonitric acid, acetic anhydride and a small amount of sulfuric acid at a temperature of from about 5 to about 15° C. After addition, stirring of the reaction mixture is briefly carried out and then it is quenched by pouring onto ice. The precipitated product, 1-(4-chlorophenyl) - 3 - (5 - nitro-2-furyl)-2-propen-1-one, is filtered and may be recrystallized from suitable solvents.

In order that my invention may be fully available to those skilled in the art, a specific method for preparing my new compound is described briefly:

Example

To a nitrating medium, prepared by adding dropwise 125 gm. of diacetylorthonitric acid to a chilled (5–12° C.) solution of 450 ml. of acetic anhydride and 1.5 ml. of concentrated sulfuric acid, is added dropwise at —20° C. 72 gm. of 1-(4-chlorophenyl)-3-(2-furyl)-2-propen-1-one [Chemical Abstracts 27:1881 (1933)] dissolved in 350 ml. of acetic anhydride maintaining the temperature at —15 to —10° C. during the addition period of about seventy minutes. The mixture is stirred for 5–10 minutes and then poured with stirring into two liters of ice water and stirring continued for two hours. The precipitated solid is filtered, washed with water, air-dried at room temperature and then recrystallized from ethyl acetate to yield 33.3 gm. (39%) of 1-(4-chlorophenyl)-3-(5-nitro-2-furyl)-2 - propen - 1 - one having a melting point of 187–189° C.

|  | Dose in mg./kg. b.i.d. | Number of days | | | | | | | |
|---|---|---|---|---|---|---|---|---|---|
|  |  | 1 | | 2 | | 4 | | 8 | |
|  |  | Pos./Total | Percent | Pos./Total | Percent | Pos./Total | Percent | Pos./Total | Percent |
| Compound | 300 | 0/10 | 0 | 2/20 | 10 | 0/20 | 0 |  |  |
| Do | 100 | 9/10 | 90 | 14/30 | 47 | 1/30 | 3 | 0/10 | 0 |
| Do | 50 | 9/10 | 90 | 9/20 | 45 | 8/30 | 27 | 0/10 | 0 |
| Do | 25 | 9/10 | 90 | 10/20 | 50 | 14/30 | 47 | 0/10 | 0 |
| Control |  | 10/10 | 100 | 30/30 | 100 | 30/30 | 100 | 10/10 | 100 |

My new compound has a low order of toxicity. In mice its $LD_{50}$ is greater than 2200 mg./kg. In its therapeutic use no toxic effects have been noted.

The preparation of my new compound in a form which will permit ready administration presents no problem to accepted pharmaceutical practice. It may be incorporated in tablets, gelatin capsules, suspensions or compositions consisting of suitable carriers and adjuvants common to the pharmaceutical art. In the treatment of domestic animals it can be incorporated in animal feed or drinking water supply and prophy-

What I claim is:

The chemical compound, 1-(4-chlorophenyl) - 3 - (5-nitro-2-furyl)-2-propen-1-one, represented by the formula:

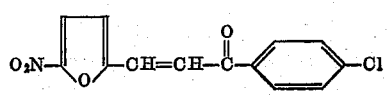

No references cited.